United States Patent [19]
Krook et al.

[11] 3,748,371
[45] July 24, 1973

[54] INSULATED CABLE WITH WIRE FOR SLITTING A PROTECTIVE SHEATH

[75] Inventors: Otto Erik Krook, Hagersten; Sven Sigurd Noroblad, Spanga, both of Sweden

[73] Assignee: Telefonaktiebolaget LM Ericsson, Stockholm, Sweden

[22] Filed: May 18, 1972

[21] Appl. No.: 254,422

[52] U.S. Cl................. 174/70 R, 174/10, 174/112
[51] Int. Cl........................... H01b 7/00, H02g 1/12
[58] Field of Search..................... 174/10, 112, 70 R

[56] References Cited
UNITED STATES PATENTS
1,969,764  8/1934  Soutter, Jr.............................. 174/10
2,147,337  2/1939  Charmoy............................. 174/112

*Primary Examiner*—Laramie E. Askin
*Attorney*—Frederick E. Hane et al.

[57] ABSTRACT

A cable having an outer protective covering or sheath enclosing one or more insulated conductors and a cutting wire or rip cord intended for slitting the covering, the cutting wire being located under a longitudinal notch on the inner side of the covering with the position of the cutting wire being marked on the outer surface of the covering, the marking having the form of a longitudinal notch or two parallel ridges.

5 Claims, 4 Drawing Figures

PATENTED JUL 24 1973    3,748,371

INSULATED CABLE WITH WIRE FOR SLITTING A PROTECTIVE SHEATH

The present invention refers to cables and especially to that kind of cables which comprise a protective covering or sheath, preferably of plastic material which covering encloses one or more conductors preferably plastic-insulated, and a wire, a thread or the like intended for the cutting up of the covering. The covering may preferably have a longitudinal part that is thinner than the rest of the covering. When pulling the wire in a direction out from the covering, the wire will slit the covering at its thinner part.

It is previously known to cut up the covering of plastic-insulated cables with the aid of an edge-tool but such edge-tools often cause inconveniences due to the fact that the underlying conductors easily can be damaged unintentionally. This could be eliminated if the covering was provided with indications which indicated where the cutting was to be done, for example immediately above the cutting wire and along the same. Upon the slitting of cables where a thread or a cutting wire is used, the covering will be opened to such an extent that the end of the cutting wire can be grasped with a pair of fingers or the like and by pulling the cutting wire, mainly perpendicularly to the cable, the wire is caused to cut through the covering. It has however been found that also the using of a cutting wire may involve certain inconveniences since it often is very difficult to localize the position of the wire under the covering. The short slitting of the covering that must be executed with a tool when trying to find the end of the cutting wire serves, it is true, as an indication for the latter cutting up with the aid of the cutting wire but the first cutting corresponds very seldom to the real position of the cutting wire.

The present invention has for a purpose to eliminate the disadvantages indicated above.

What principally may be considered to be the characteristics of the cable according to the present invention is indicated in the characterizing part of the following claim 1.

In the accompanying drawing two embodiments of the invention will be illustrated more closely.

Figure 1:
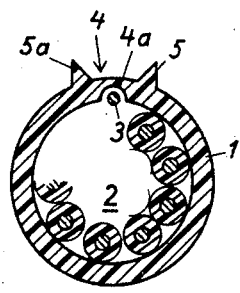
FIG. 1 shows the cross-section of a cable by means of a first embodiment.

In FIG. 1 the cross-section of a cable is shown. This cable shows an outer protective covering or sheath 1, preferably of plastic material, one or more conductors enclosed by the covering, with the common reference numeral 2 and preferably plastic-insulated, and a cutting wire 3 located immediately underneath the covering. The covering 1 has a part 4 which is thinner than the rest of the covering. This thinner part 4 is formed by arranging a notch 4a on the inner side of the covering.

The outer surface of the covering 1 is further provided with two ridges 5,5a located on both sides of the thinner part 4 and running parallelly, serving as marking for the cutting wire 3.

Figure 2:
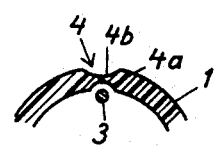
FIG. 2 shows the cross-section of a cable by means of a second embodiment.

In FIG. 2 a second embodiment of a cable is shown in cross-section. The marking has here the form of a longitudinal notch 4b in the outer surface of the covering. It is evident that this longitudinal notch affords the thinning of the covering, required for the cutting up of the same, but in order to facilitate the placing of the cutting wire 3 under 4b the covering is suitably provided with a notch 4a on the inside.

The cutting wire 3 can consist of different materials and according to the invention it is proposed that the wire consists of nylon, glass fibre or the like.

Figure 3:
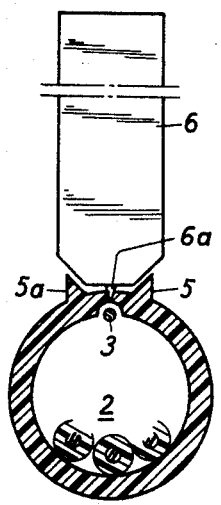
FIG. 3 shows the cable according to FIG. 1 when a cutting tool is allowed to affect the covering and furthermore
Figure 4:
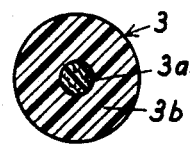
FIG. 4 shows on an enlarged scale the cross-section of a suitably shaped cutting wire.

According to FIG. 4 the wire 3 can comprise a central part 3a enclosed by a coating 3b where the central part is composed of glass fibre, nylon or the like while the coating 3b with advantage can consist of plastic material. By placing such a wire 3 according to FIG. 4 in the notch 4a the wire 3 can serve to protect the enclosed conductors 2 from being cut through which is illustrated in connection with FIG. 3.

It is suitable, provided that the cutting wire is designed according to FIG. 4 that the wire with its coating is so adapted that it is possible to insert or center it in the notch 4a.

In FIG. 3 is then shown how a cable according to FIG. 1 with a wire according to FIG. 4 is cut by means of a tool 6. The cutting tool 6 comprises a cutting edge 6a which can be adjusted to the desired depth of cut in known manner. It is here the purpose of the ridges, 5,5a to control the tool 6 while the wire 3, of the kind described in FIG. 4, serves to protect underlying parts 2 in the cable from being slit or cut. In such a case an arbitrarily short cable can be unsheathed since the wire 3 is not at all exposed to pulling.

Upon the manufacture of the cable the covering, as it is shown earlier, can be made thinner. The wire 3 is suitably placed in the notch 4a at the extruder head. If the cutting wire is brought to the conductors 2 before the covering is extruded it is essential that the cutting wire really comes into co-operation with the notch. The extruder head forming the covering may also be designed in such a way as to form on the one hand a notch 4a on the inner surface of the covering, and on the other hand to form ridges 5,5a on the outer surface of the covering, located beside each other and on either side of the notch. Furthermore, the extruder head can be designed to form a notch 4b on the outer side of the covering and to form a further notch 4a on the inner side of the covering. With this embodiment it can be suitable to let the notches be of different sizes and as shown in FIG.2.

Upon the extrusion of the covering the wire is permitted to pass into the extruder head so that it will place itself automatically in the notch 4a. Since, according to the invention, the outer part of the covering shall either be provided with ridges 5,5a or with a notch 4b in connection with the cutting wire it is easy to localize the position of the wire and to cut by means of a knife or the like the thinned part so much that the wire easily can be seized. Because the covering is thinned in connection with the wire the tractive force required will be reduced, in consequence of which slitting of also short cables can be executed with the aid of the cutting wire without the wire slipping out of the cable. In case ridges 5,5a are selected for the outer surface of the cable these will also form a protection against unintentional mechanical influence on the thinned part.

The invention is of course not limited to the embodiments indicated above as examples but can have modifications within the scope of the following claims.

We claim:

1. An electrical cable comprising at least one insulated conductor, a cutting wire extending longitudinally along said insulated conductor, and a protective sheath surrounding said insulated conductor and cutting wire, the inner surface of said sheath being provided with a first longitudinally extending groove for accommodating said cutting wire to constrain the location thereof, and the outer surface of said sheath being provided with longitudinally extending means for mechanically guiding the movement of a cutting tool to a longitudinal path opposite said cutting wire.

2. The cable of claim 1 wherein said longitudinally extending means comprises a second longitudinally extending groove parallel to said first longitudinally extending groove.

3. The cable of claim 1 wherein said longitudinally extending means comprises two longitudinally extending ridges parallel to and straddling said first longitudinally extending groove.

4. The cable of claim 1 wherein said cutting wire is of a fibrous insulating material.

5. The cable of claim 1 wherein said cutting wire is further sheathed with a protective layer.

* * * * *